United States Patent
Qiang et al.

(10) Patent No.: US 10,009,150 B2
(45) Date of Patent: Jun. 26, 2018

(54) METHODS, APPARATUSES AND USER EQUIPMENT FOR HYBRID AUTOMATIC REPEAT REQUEST TRANSMISSION

(71) Applicant: Telefonaktiebolaget LM Ericsson (publ), Stockholm (SE)

(72) Inventors: Yongquan Qiang, Beijing (CN); Hong Ren, Kanata (CA); Ping Yu, Ottawa (CA); Feng Li, Beijing (CN); Yang Tian, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 15/039,318

(22) PCT Filed: Nov. 28, 2013

(86) PCT No.: PCT/CN2013/088071
§ 371 (c)(1),
(2) Date: May 25, 2016

(87) PCT Pub. No.: WO2015/077964
PCT Pub. Date: Jun. 4, 2015

(65) Prior Publication Data
US 2017/0214494 A1    Jul. 27, 2017

(51) Int. Cl.
*H04L 1/18* (2006.01)
*H04W 24/02* (2009.01)
(Continued)

(52) U.S. Cl.
CPC .......... *H04L 1/1819* (2013.01); *H04W 24/02* (2013.01); *H04L 5/0055* (2013.01); *H04W 76/048* (2013.01)

(58) Field of Classification Search
None
See application file for complete search history.

(56) References Cited

U.S. PATENT DOCUMENTS 9,681,326 B2 * 6/2017 He .................... H04W 28/0205
2005/0220204 A1 * 10/2005 Agin .................... H04L 1/0066
375/261

(Continued)

FOREIGN PATENT DOCUMENTS

| CN | 101222304 | 7/2008 |
| CN | 102412943 | 4/2012 |

(Continued)

OTHER PUBLICATIONS

Supplementary Partial European Search Report for Application No. EP 13 89 8046—dated Apr. 10, 2017.

(Continued)

*Primary Examiner* — Robert C. Scheibel
(74) *Attorney, Agent, or Firm* — Baker Botts, LLP

(57) ABSTRACT

Methods, apparatuses and a user equipment for performing a Hybrid Automatic Repeat Request (HARQ) transmission in a downlink from a base station to at least one user equipment are provided. An exemplary method comprises receiving a HARQ feedback to a HARQ transmission performed with respect to a transport block. The method further comprises determining whether the HARQ feedback is an ambiguous HARQ feedback with respect to a negative acknowledgement or a discontinuous transmission. The method additionally comprises setting (S206) the ambiguous HARQ feedback as the negative acknowledgement or the discontinuous transmission based on the number of HARQ transmissions having been performed and the corresponding received HARQ feedbacks within a target number of HARQ transmissions counting from a first HARQ transmission. With the methods and apparatuses, the ambiguity of the HARQ feedback can be overcome and communication efficiency may be improved.

12 Claims, 6 Drawing Sheets

(51) Int. Cl.
*H04W 76/04* (2009.01)
*H04L 5/00* (2006.01)

(56) References Cited

U.S. PATENT DOCUMENTS

2009/0279460 A1* 11/2009 Sarkar .................. H04L 1/16
370/280
2012/0076077 A1* 3/2012 Buckley ................ H04L 1/1607
370/328
2013/0301583 A1 11/2013 Lundby

FOREIGN PATENT DOCUMENTS

| CN | 102598572 | 7/2012 |
|----|-----------|--------|
| EP | 2 843 866 A1 | 3/2015 |
| WO | WO 2013 141790 A2 | 9/2013 |
| WO | WO 2013 141790 A3 | 9/2013 |
| WO | WO 2013 141790 A9 | 9/2013 |
| WO | WO 2013 159463 A1 | 10/2013 |

OTHER PUBLICATIONS

Extended European Search Report for Application No./Patent No. 13898046.1-1875 / 3075093 PCT/CN2013088071—dated Aug. 17, 2017.
Performance and Modeling of LTE H-ARQ by Ikuno et al.; accepted for publication in the proceedings of WSA 2009, Berlin, 2009—copyright 2009.
3GPP TS 36.213 v10.0; Technical Specification; 3rd Generation Partnership Project; Technical Specification Group Radio Access Network; Evolved Universal Terrestrial Radio Access (E-UTRA); Physical layer procedures (Release 10)—Jun. 2013.
International Search Report for International Application No. PCT/CN2013/088071—dated Aug. 14, 2014.
PCT Written Opinion of the International Searching Authority for International application No. PCT/CN2013/088071—dated Aug. 7, 2014.

* cited by examiner

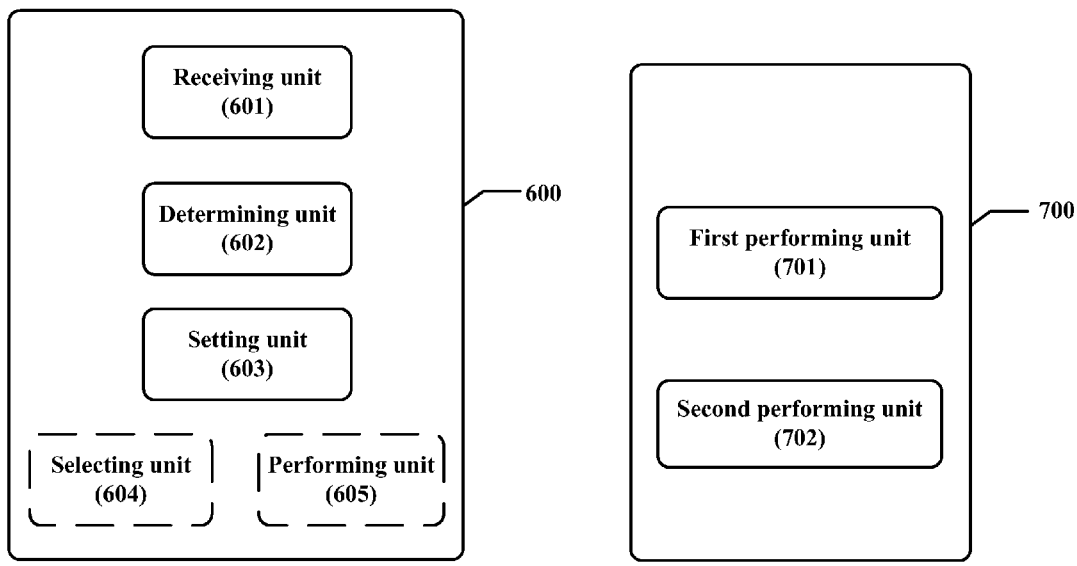
Fig. 6
Fig. 7
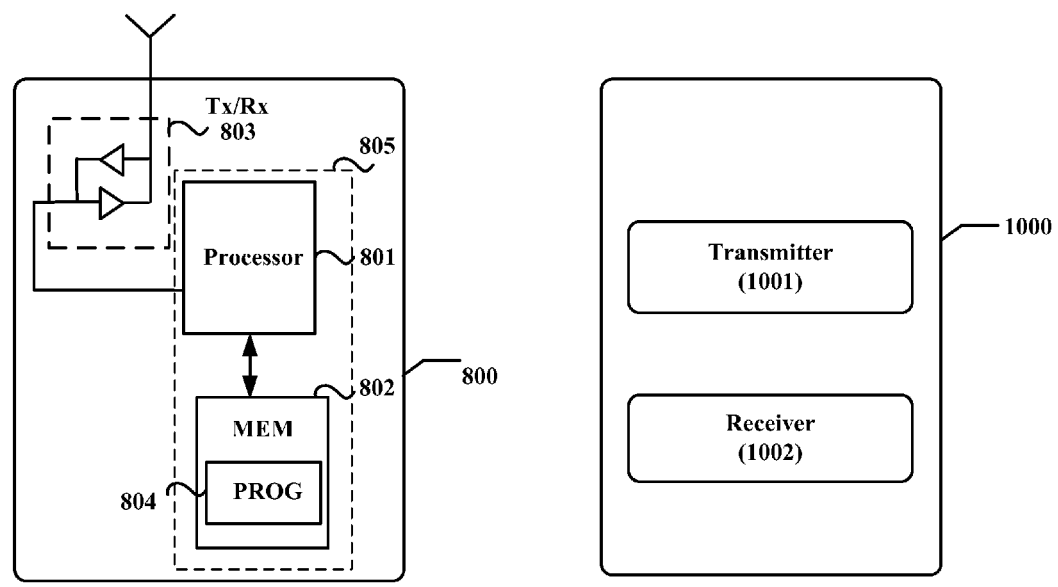
Fig. 8
Fig. 10

METHODS, APPARATUSES AND USER EQUIPMENT FOR HYBRID AUTOMATIC REPEAT REQUEST TRANSMISSION

PRIORITY

This non-provisional application is a U.S. National Stage Filing under 35 U.S.C. § 371 of International Patent Application Serial No. PCT/CN2013/088071, filed Nov. 28, 2013, and entitled "METHODS, APPARATUSES AND USER EQUIPMENT FOR HYBRID AUTOMATIC REPEAT REQUEST TRANSMISSION."

TECHNICAL FIELD

The non-limiting and exemplary embodiments of the present disclosure herein relate to a wireless communication field. In particular, the embodiments herein relate to methods, apparatuses and a user equipment ("UE") for performing a Hybrid Automatic Repeat Request ("HARQ") transmission in a Downlink ("DL") from a Base Station ("BS") to at least one UE.

BACKGROUND

In a third Generation Partnership Project ("3GPP") Long Term Evolved ("LTE") system without a Carrier Aggregation ("CA") technique, such as LTE Frequency Duplex Division ("FDD") or Time Duplex Division ("TDD") systems with a (positive) Acknowledgment ("ACK")/Negative Acknowledgement ("NACK") bundling mechanism, one Uplink ("UL") feedback represents a HARQ feedback of a single DL subframe or bundling window. If a Physical Downlink Control Channel ("PDCCH") has not been successfully detected by a UE, the UE may determine presence of a Discontinuous Transmission ("DTX") and thus will not transmit a HARQ feedback on a Physical Uplink Control Channel ("PUCCH") or a Physical Uplink Shared Channel ("PUSCH"). If the PDCCH has been detected, an ACK or a NACK will be reported on the PUCCH or PUSCH based on whether a Physical Downlink Shared Channel ("PDSCH") has been successfully decoded or not. In this manner, it is possible for an evolved Node B ("eNB") to detect the PDCCH DTX by measuring the power level of the HARQ feedback on the PUCCH or PUSCH.

As is known to those skilled in the art, the CA technique is introduced in the 3GPP LTE Release 10 ("Rel-10") with an aim of doubling the peak throughput by aggregating multiple carriers to perform simultaneous transmissions for a single UE. In a CA system with multiple Component Carriers (CCs) in a DL, multiple parallel HARQ transmissions may be performed for one CA-enabled UE in a Primary Cell ("PCell") and activated Secondary Cells ("SCells"). Thereby, the UE is required to report several HARQ feedbacks for the PCell and SCells through a single UL subframe. To this end, new HARQ feedback modes of a PUCCH format 1b with channel selection and a PUCCH format 3 have been specified by the 3GPP for the CA, which are capable of carrying more feedback bits for multiple HARQ transmissions in one DL subframe or bundling window.

However, in the CA with ACK/NACK multiplexing, one UL HARQ feedback represents ACK/NACK for more than one DL HARQ transmissions, such as 2 CCs in DL. In particular, the UE will transmit the HARQ feedback on the PUCCH or PUSCH as long as one DL grant is received in a corresponding subframe or bundling window. A NACK/DTX may also be reported by the UE for subframes that failed to detect the PDCCH (resulting in DTX) or decode the PDSCH (resulting in NACK). As such, whether the NACK/DTX represents the NACK or DTX becomes ambiguous, and the eNB cannot distinguish the NACK against DTX from the reported ambiguous feedback NACK/DTX.

For example, in case of the CA FDD or TDD system with a bundling window size (M) being equal to 1, if an ACK or a NACK is reported from the UE for one of paired Codewords ("CWs"), it may be assumed that there is no PDCCH being lost. However, if the NACK/DTXs are reported for both CWs, the eNB may get confused about these ambiguous feedbacks. The ambiguity is more serious in the CA TDD system with M>1, where there is more ACK/NACK multiplexing and bundling within the bundling window and among CWs. Since the NACK/DTXs are bundled for paired CWs, any received NACK/DTX has an uncertainty issue with respect to the NACK or DTX.

The uncertainty of received NACK/DTX brings problems for normal HARQ retransmissions and outer-loop adjustment of PDCCH Link Adaptation ("LA"). Normally, the HARQ retransmission and outer-loop adjustment of the PDCCH LA are performed according to the received feedback as follows:

1) Received NACK (10% Probability as Block Error Ratio ("BLER") Target of PDSCH LA)

The next Redundancy Version ("RV") is retransmitted until an allowed maximum number of HARQ transmissions. The overall RV sequence is RV0→RV2→RV3→RV1 as recommended by 3GPP. The NACK is used for outer-loop adjustment of PDSCH LA to guarantee 10% BLER target.

2) Received DTX (1% Probability as Targeted PDCCH Loss Rate of PDCCH LA)

The previous RV is retransmitted. The DTX is used for outer-loop adjustment of PDCCH LA to guarantee 1% PDCCH loss rate.

From the above, it can be seen that the HARQ retransmission and PDCCH LA outer-loop adjustment depend heavily on the definite feedback of the NACK or DTX; otherwise, the eNB does not know how to perform the HARQ retransmission and PDCCH LA outer-loop adjustment, which might result in a loss of HARQ combining gain and inaccuracy of PDCCH LA.

Generally, there are two solutions to handle NACK/DTX ambiguity. One is handling the NACK/DTX simply as the DTX and another one is handling it simply as the NACK. However, both solutions result in undesirable and adverse impacts on the system performance. Regarding handling as the DTX, given 10% PDSCH BLER target and 1% PDCCH lost rate, the NACK/DTX is likely to be the NACK with more than 90% probability. However, if it is simply handled as the DTX, a previous RV is retransmitted. In this way, only Chase Combing ("CC") can be done by the UE and Incremental Redundancy ("IR") combining gain will be lost, which degrades the CA throughput, especially in case of channel with fluctuation. Further, since the real PDCCH DTX probability is about 1%, the estimated DTX probability with this method is too high (about 10%) to be used for outer-loop adjustment of PDCCH LA. In other words, there exists a false alarm of the PDCCH DTX, which may lead to an improper outer-loop adjustment. Regarding handling as the NACK, it may give rise to more HARQ transmissions if the ambiguous NACK/DTX actually means the DTX. For instance, if the initial RV0 has been lost and the UE transmits the NACK/DTX as the feedback to the eNB, the eNB should retransmit the RV0 for improving the success rate of the decoding at the UE side by setting the NACK/

DTX as the DTX. However, due to handling the NACK/ DTX as the NACK, the eNB would retransmit the subsequent RVs (e.g., RV2, RV3 and RV1), which likely results in a decoding failure at the UE side due to the absence of RV0. Thus, extra HARQ retransmissions are introduced resulting in throughput degradation. Further, due to simply handling as the NACK and miss detection of the PDCCH DTX, the real PDCCH DTX cannot be detected and thus abnormal PDCCH LA may arise since a proper determination of the DTX plays a key role in the outer-loop adjustment of the PDCCH LA, as mentioned above.

In short, simply handling the NACK/DTX as either NACK or DTX is not optimized for both the HARQ transmission and the LA outer-loop adjustment.

SUMMARY

It is an object of the present disclosure to address at least one of the problems outlined above, and to provide solutions for eliminating ambiguity of the NACK/DTX feedback such that communication efficiency may be enhanced. This object may be realized by providing methods and apparatuses for performing a HARQ in a downlink from a base station to at least one user equipment.

According to an aspect of the disclosure, there is provided a method for performing a HARQ transmission in a downlink from a base station to at least one user equipment. The method comprises receiving a HARQ feedback to a HARQ transmission performed with respect to a transport block. The method further comprises determining whether the HARQ feedback is an ambiguous HARQ feedback with respect to a negative acknowledgement or a discontinuous transmission. The method additionally comprises setting the ambiguous HARQ feedback as the negative acknowledgement or the discontinuous transmission based on the number of HARQ transmissions having been performed and the corresponding received HARQ feedbacks within a target number of HARQ transmissions counting from a first HARQ transmission.

In one embodiment, the step of the setting is performed each time the ambiguous HARQ feedback is received.

In another embodiment, the target number is two and the step of the setting comprises one of the following: setting a first received HARQ feedback as the negative acknowledgement if it is ambiguous; setting a second received HARQ feedback as the discontinuous transmission if the first received HARQ feedback is the negative acknowledgement and the second received HARQ feedback is ambiguous; setting the second received HARQ feedback as the discontinuous transmission if the first and the second received HARQ feedbacks are both ambiguous; and setting the second received HARQ feedback as the negative acknowledgement if the first received HARQ feedback is the discontinuous transmission and the second HARQ feedback is ambiguous.

In an additional embodiment, the first received HARQ feedback is ambiguous and the method further comprises selecting an explicit or implicit downlink assignment for a second HARQ transmission.

In a further embodiment, the step of the selecting is based on a coding rate or a modulation and coding scheme for the first or second HARQ transmission.

In an embodiment, the selecting of the explicit or implicit downlink assignment comprises selecting the explicit downlink assignment if the coding rate or the modulation and coding scheme index is above a respective threshold value and selecting the implicit downlink assignment if the coding rate or the modulation and coding scheme index is below the respective threshold value.

In another embodiment, the ambiguous HARQ feedbacks are set after full reception of HARQ feedbacks for the target number of HARQ transmissions.

In a further embodiment, the target number is two and the step of the setting comprises one of the following: setting one of two received HARQ feedbacks as the discontinuous transmission and the other one as the negative acknowledgement if the two HARQ feedbacks are both ambiguous; setting the ambiguous HARQ feedback as the negative acknowledgement if one of the two received HARQ feedbacks is the discontinuous transmission and the other one is ambiguous; setting the ambiguous HARQ feedback as the discontinuous transmission if one of the two received HARQ feedbacks is the negative acknowledgement and the other one is ambiguous; and setting the ambiguous HARQ feedback as the negative acknowledgement if the first received HARQ feedback is ambiguous and the second received one is a positive acknowledgement.

In an embodiment, the method further comprises performing a HARQ retransmission with an initial redundancy version immediately after the ambiguous HARQ feedback is set as the discontinuous transmission.

In another embodiment, both the first and second received HARQ feedbacks are ambiguous and the method further comprises selecting an explicit downlink assignment for the HARQ retransmission with the initial redundancy version.

In a further embodiment, the method also comprises determining, as the negative acknowledgement, each of the ambiguous HARQ feedbacks received when a positive acknowledgement or a negative acknowledgement with respect to another transport block is received, wherein the other transport block is paired with the transport block in downlink assignment and transmission. The method further comprises determining, as the discontinuous transmission, the ambiguous HARQ feedback received when the discontinuous transmission with respect to the other transport block is received.

In an additional embodiment, the method further comprises performing link adaptation outer-loop adjustment for downlink traffic or control channels based on unambiguous HARQ feedbacks and set HARQ feedbacks.

According to another aspect of the disclosure, there is provided a method for performing a HARQ transmission in a downlink from a base station to at least one user equipment. The method comprises performing a target number of HARQ transmissions according to an incremental redundancy version sequence. The method further comprises performing a HARQ retransmission with an initial redundancy version immediately after the target number of HARQ transmissions have been performed.

In an embodiment, the target number is two and a first received HARQ feedback is ambiguous, and the method further comprises selecting an explicit or implicit downlink assignment for a second HARQ transmission.

In a further embodiment, the step of selecting is based on a coding rate or a modulation and coding scheme for a first or the second HARQ transmission.

In an additional embodiment, the selecting of the explicit or implicit downlink assignment comprises selecting the explicit downlink assignment if the coding rate or the modulation and coding scheme index is above a respective threshold value; and selecting the implicit downlink assignment if the coding rate or the modulation and coding scheme index is below the respective threshold value.

In a further embodiment, the target number is two, and a first received HARQ feedback and a second received HARQ feedback are both ambiguous, and the method further comprises selecting an explicit downlink assignment for the HARQ retransmission with the initial redundancy version.

According to an aspect of the disclosure, there is provided an apparatus for performing a HARQ transmission in a downlink from a base station to at least one user equipment. The apparatus comprises a receiving unit configured to receive a HARQ feedback to a HARQ transmission performed with respect to a transport block. The apparatus further comprises a determining unit configured to determine whether the HARQ feedback is an ambiguous HARQ feedback with respect to a negative acknowledgement or a discontinuous transmission. The apparatus also comprises a setting unit configured to set the ambiguous HARQ feedback as the negative acknowledgement or the discontinuous transmission based on the number of HARQ transmissions having been performed and the corresponding received HARQ feedbacks within a target number of HARQ transmissions counting from a first HARQ transmission.

According to another aspect of the disclosure, there is provided an apparatus for performing a HARQ transmission in a downlink from a base station to at least one user equipment. The apparatus comprises a first performing unit configured to perform a target number of HARQ transmissions according to an incremental redundancy version sequence. The apparatus further comprises a second performing unit configured to perform a HARQ retransmission with an initial redundancy version immediately after the target number of HARQ transmissions have been performed.

According to an aspect of the disclosure, there is provided an apparatus for performing a Hybrid Automatic Repeat Request (HARQ) transmission in a downlink from a base station to at least one user equipment. The apparatus comprises at least one processor, at least one memory including computer program code, wherein the at least one memory and the computer program code are configured to, with the at least one processor, cause the apparatus at least to perform the methods as outlined above and discussed below.

According to another aspect of the disclosure, there is provided an apparatus for performing a Hybrid Automatic Repeat Request (HARQ) transmission in a downlink from a base station to at least one user equipment. An apparatus comprises processing means adapted to perform the methods as outlined above and discussed below.

According to an aspect of the present disclosure, there is provided a method for receiving a Hybrid Automatic Repeat Request (HARQ) transmission in a downlink from a base station. The method comprises receiving, from the base station, each of a target number of HARQ transmissions with respect to a transport block. The method also comprises sending, to the base station, HARQ feedbacks corresponding to the target number of HARQ transmissions, wherein the HARQ feedbacks include one or more ambiguous HARQ feedbacks with respect to a negative acknowledgement or a discontinuous transmission, wherein the receiving comprises receiving an explicit or implicit downlink assignment which is made by the base station based on the number of HARQ transmissions having been performed and the corresponding received HARQ feedbacks within the target number of HARQ transmissions counting from a first HARQ transmission.

According to another aspect of the present disclosure, there is provided a user equipment for receiving a Hybrid Automatic Repeat Request (HARQ) transmission in a downlink from a base station. The user equipment comprises a receiver configured to receive, from the base station, each of a target number of HARQ transmissions with respect to a transport block. The user equipment also comprises a transmitter configured to transmit to the base station, HARQ feedbacks corresponding to the target number of HARQ transmissions, wherein the HARQ feedbacks include one or more ambiguous HARQ feedbacks with respect to a negative acknowledgement or a discontinuous transmission, wherein the receiving comprises receiving an explicit or implicit downlink assignment which is made by the base station based on the number of HARQ transmissions having been performed and the corresponding received HARQ feedbacks within the target number of HARQ transmissions counting from a first HARQ transmission.

The above outlines the various aspects and embodiments of the present disclosure. The solutions set forth in the various embodiments should not be understood as operating independently but may be in combination with each other, as will be known to those skilled in the art under the teaching of the present disclosure.

By means of solutions discussed in the various aspects and embodiments as mentioned above, the ambiguity of NACK/DTX feedback received within a target number of times may be overcome and thereby the apparatus (i.e., BS) has been given the capability of deciding how to implement a DL assignment and outer-loop adjustment of LA, e.g., for the PDCCH. Further, by selecting an RV0 (initial version) for HARQ transmission upon setting the ambiguous NACK/DTX as the DTX, IR combining gain may also be achieved.

BRIEF DESCRIPTION OF THE DRAWINGS

Embodiments will now be described in more detail in relation to the enclosed drawings, in which:

FIG. 6 is a block diagram schematically depicting an apparatus for a HARQ transmission in a DL from a BS to at least one UE according to embodiments of the present disclosure, FIG. 7 is a block diagram schematically depicting an apparatus for a HARQ transmission in a DL from a BS to at least one UE according to embodiments of the present disclosure, FIG. 8 is a schematic block diagram of an apparatus for a HARQ transmission in a DL from a BS to at least one UE according to embodiments of the present disclosure, FIG. 10 is a schematic block diagram of an apparatus for receiving a HARQ transmission in a DL from a BS according to embodiments of the present disclosure.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the UE may be any suitable wireless communication terminal, such as a mobile phone or a portable computer. However, this should not limit the present disclosure to any specific communication standard. Rather, the terms UE and communication terminal may be regarded as essentially synonymous, unless conflicting with the context. Likewise, the BS may be any suitable radio BS, according to any suitable communication standard, such as a Node B or an eNode B.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 1:
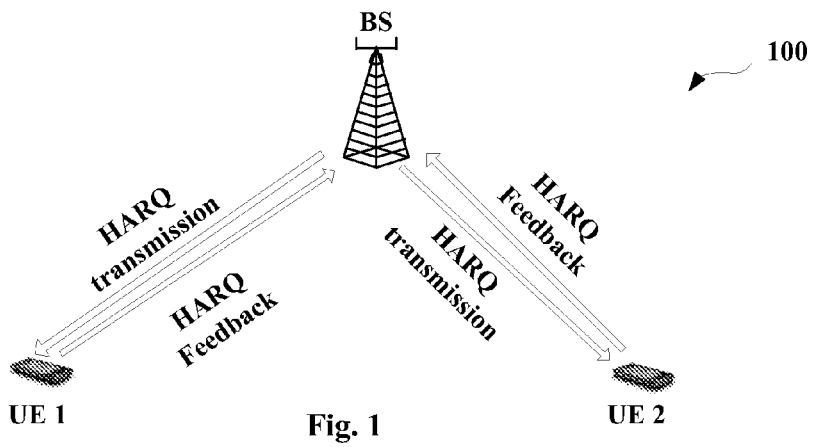
FIG. 1 is a schematic overview depicting a wireless communications network in which the embodiments of the present disclosure may be practiced.

FIG. 1 is a schematic overview depicting a wireless communications network 100, in which the embodiments of the present disclosure may be practiced. As depicted in FIG. 1, a BS, also referred to as a NodeB or an eNB, is communicating with a UE 1 and a UE 2. It should be noted that the two UEs as shown are only for illustrative purposes and there may be hundreds of UEs in a coverage area of the BS depending on the coverage capability thereof.

In an exemplary scenario, the BS may send the HARQ transmission in the DL direction to UE 1 or 2 and in response, receive the HARQ feedbacks in the UL direction from the UE 1 or 2. As discussed before, depending on various factors, the UE may send an ACK, a NACK, or a NACK/DTX feedback to the BS, such as upon successfully decoding the PDSCH, successfully detecting the PDCCH but unsuccessfully decoding the PDSCH, e.g., in a CA-enabled system. Once the NACK/DTX is received from the UE, e.g., UE 1, the BS cannot determine whether the NACK/DTX refers to the NACK or the DTX and thereby cannot carry out a proper DL assignment or LA outer-loop adjustment which mainly relies on the correct HARQ feedbacks. To this end, the present disclosure proposes several solutions, which are mentioned above and will be detailed in the following in the various aspects and embodiments, to overcome this ambiguity issue and other problems resulting therefrom or relating thereto and thereby notably boost the communication efficiency.

Figure 2:
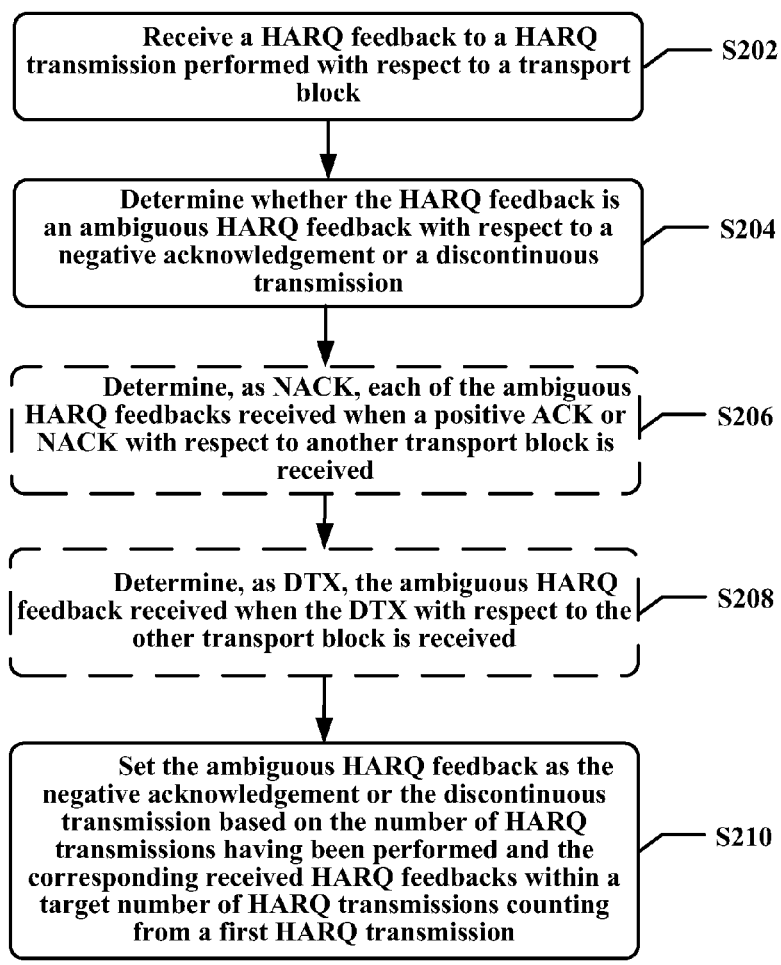
FIG. 2 is a schematic flowchart of a method for a HARQ transmission in a DL from a BS to at least one UE according to embodiments of the present disclosure.

FIG. 2 is a schematic flowchart of a method 200 for a HARQ transmission in a DL from a BS to at least one UE according to embodiments of the present disclosure. For an easy understanding of reasonability of the method 200, it is assumed that the PDSCH BLER target is 10% and the probability of NACK for the first HARQ transmission is 10% after the PDSCH LA. Further, it is assumed that the target of PDCCH loss rate is 1%, and the probability of PDCCH DTX is 1% after the PDCCH LA.

As illustrated in FIG. 2, at step S202, the method 200 receives a HARQ feedback to a HARQ transmission performed with respect to a transport block. At step S204, the method 200 determines whether the HARQ feedback is an ambiguous HARQ feedback with respect to a NACK or a DTX. The ambiguous HARQ feedback herein refers to the NACK/DTX feedback and could be determined or identified by different bits or bit combinations.

At an optional step S206 as depicted in the dashed block, the method 200 determines, as the NACK, each of the ambiguous HARQ feedbacks received when a ACK or a NACK with respect to another transport block is received, wherein the other transport block is paired with the transport block in DL assignment and transmission. At another optional step S208, the method 200 determines, as the DTX, the ambiguous HARQ feedback received when the DTX with respect to the other transport block is received. The steps S206 and S208 may take place in a Multiple Input Multiple Output ("MIMO") system. In the MIMO system, two transport blocks or CWs are scheduled by one DL assignments for paired HARQ transmissions. The NACK/DTX for any transport block is first determined according to its paired HARQ feedbacks. That is, if one of the paired HARQ feedbacks is determined as the ACK or NACK, then the ambiguous NACK/DTX from the other one of the paired HARQ feedbacks is set as NACK. Similarly, if one of the paired HARQ feedbacks is determined as a DTX, i.e., a definite DTX being received, the ambiguous NACK/DTX from the other one of the paired HARQ feedbacks is set as the DTX.

Upon determining a reception of the ambiguous HARQ feedback, at step S210, the method 200 sets the ambiguous HARQ feedback as the NACK or DTX based on the number of HARQ transmissions having been performed and the corresponding received HARQ feedbacks within a target number of HARQ transmissions counting from a first HARQ transmission. The target number of HARQ transmissions herein may be a configurable value, such as an experience value resulting from a number of simulations, and could be given the value of two, which would be described as a preferred value in detail with reference to FIGS. 3 and 4.

Although not expressly depicted in FIG. 2, in an embodiment, the setting as performed at step S210 may be performed each time the NACK/DTX feedback is received. In other words, upon receipt of the NACK/DTX feedback, the BS would apply the solution as proposed to set or interpret the NACK/DTX as the NACK or DTX, as exemplarily depicted in FIG. 3. In another embodiment, the setting as performed at step S210 may be performed after receiving all feedbacks within the target number of the HARQ transmissions, as exemplarily depicted in FIG. 4.

In an embodiment, the method 200 further performs a HARQ retransmission with an initial redundancy version (e.g., RV0) immediately after the NACK/DTX is set as the DTX. In this way, the currently retransmitted RV0 may be combined with the RV0 transmitted at the first HARQ transmission to achieve the CC gain, or with the RV2 transmitted at the second HARQ transmission to achieve the IR combining gain, which improves the CA throughput, especially in case of the channel with fluctuation.

In another embodiment, the method 200 further performs LA outer-loop adjustment for DL traffic and control channels based on unambiguous HARQ feedbacks and set HARQ feedbacks. The unambiguous HARQ feedbacks herein may refer to ACKs, NACKs or DTXs that may be received from the UE and expressly indicate to the BS the reception situation of the UE for the corresponding DL transmission.

The above describes the method 200 with reference to FIG. 2 and its various extensions in some embodiments. It should be noted that the order of the steps is only illustrative and should not be taken to limit the scope of the present disclosure. A person skilled in the art, upon teaching of the present disclosure, is able to change or modify the order of the method steps to meet various requirements, such as for different wireless systems or applied different transmission technique. Further, the skilled person, upon teaching, may also add, remove, or replace some steps such that the proposed solutions could be preformed more efficiently in the practical wireless communication environment. For example, the optional steps S206 and S208 may be added if the applied system is a MIMO system. Again, although two times of HARQ transmission (one new or initial HARQ transmission and one HARQ retransmission) are preferred or exampled, as will be discussed later, a person skilled in the art may set the target number as any suitable number in order to achieve a better detection rate of the DTX or NACK or improved throughputs to meet practical system requirements.

Figure 3:
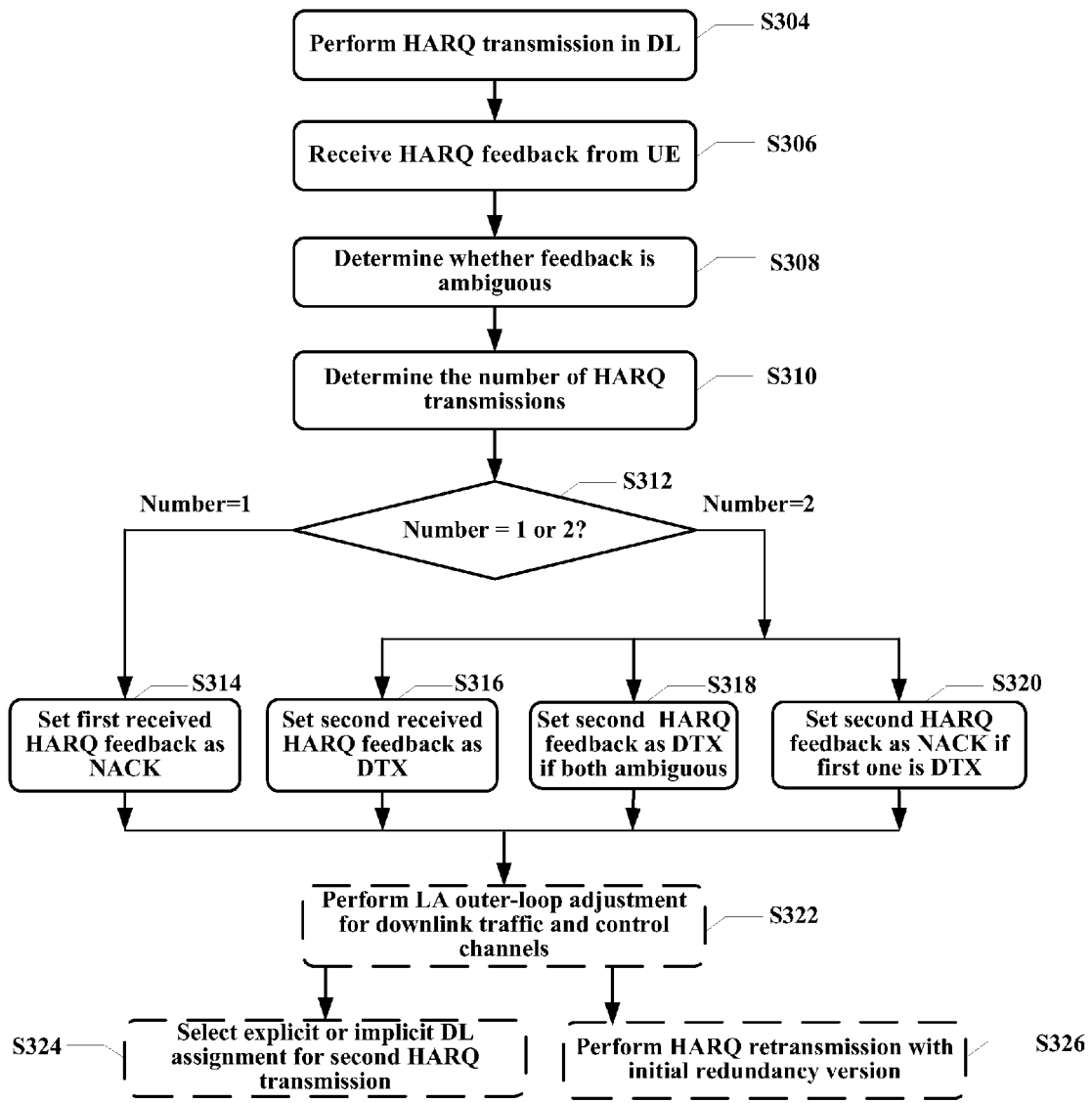
FIG. 3 is a schematic flowchart of another method for a HARQ transmission in a DL from a BS to at least one UE according to embodiments of the present disclosure.

FIG. 3 is a schematic flowchart of another method 300 for a HARQ transmission in a DL from a BS to at least one UE according to embodiments of the present disclosure. As mentioned before, the method 300 is an exemplary and preferred embodiment of the present disclosure when the target number in the method 200 is predetermined as two and the setting in the method 200 is performed each time the ambiguous NACK/DTX is received.

The method 300 performs the HARQ transmission(s) on DL, for example, performs a first HARQ transmission with an initial redundancy version RV0 or a second HARQ transmission with the redundancy version RV2. In response, at step S306, the method 300 receives a HARQ feedback from the at least one UE (e.g., UE 1 or 2 as depicted in FIG. 1). Then, at step S308, the method 300 determines whether the received HARQ feedback is ambiguous or not, e.g., through different known bits or bit combinations. Upon determination of the ambiguity of the HARQ feedback, the method 300, at step S310, determines the number of HARQ transmissions, i.e., how many times the HARQ transmissions have been performed thus far. At step S312, the method 300 decides whether the number is greater than two, which is the target number as predefined. If the number is less than two, i.e., the number is equal to one, meaning that the first HARQ transmission has been performed, then the flow advances to steps S314 at which the method 300 sets the NACK/DTX as the NACK if the first received HARQ feedback is ambiguous. Then the flow may go through, where necessary, an optional step S322 or S324 which will be discussed later, and loop back to step S304 for a second HARQ transmission, although not expressly depicted in FIG. 3.

If the number is equal to two, it means that the second HARQ transmission has been performed. Then the method 300 may switch to steps S316, S318 or S320 depending on the reception result of the first and second received HARQ feedbacks. In particular, the method 300 sets the second received HARQ feedback as the DTX if the first received HARQ feedback is the NACK and the second received HARQ feedback is ambiguous at step S316. The method 300 also sets the second received HARQ feedback as the DTX if the first and second received HARQ feedbacks are ambiguous at step S318. Similarly, the method 300 further sets the second received HARQ feedback as the NACK if the first received HARQ feedback is the DTX and the second received HARQ feedback is ambiguous at step S320.

The setting operations in which two received HARQ feedbacks are both ambiguous may be briefly expressed in a pseudo code-like manner with an RV mapping table 1 as below:

```
If HARQ_Feedback==NACK/DTX
    If number_of_HARQTransmission==2
        Set HARQ_Feedback = DTX
    Else
        Set HARQ_Feedback = NACK
    End
    Select next_RV Index=RV_mapping_table
        (number_of_HARQTransmission+1)
End
```

TABLE 1

The proposed RV mapping table

| number_of_HARQTransmission | RV Index |
|---|---|
| 1 | RV0 |
| 2 | RV2 |
| 3 | RV0 |
| 4 | RV3 |
| 5 | RV1 |

To facilitate a better understanding of the present disclosure, below is the analysis in detail about why the above handling or set is reasonable and better than prior solutions as discussed before.

When the ambiguous feedback (i.e., NACK/DTX) is received for the first HARQ transmission (RV0), there are two possible cases as follows:

1) RV0→DTX

In this case, since the feedback is the DTX, it means that the grant for the first HARQ transmission (e.g., carried by the PDCCH) is lost. Due to setting as the NACK, retransmitted RV2 as shown in the mapping table 1 might not be self-decoded. Since the PDCCH loss rate is generally 1% and the RV0 will be retransmitted for the third HARQ transmission if the HARQ feedback for the RV2 (i.e., the second HARQ transmission) is still the NACK/DTX, it has little impact on the overall throughput (1% loss due to one more HARQ transmission). Such loss may be compensated by the IR combing gain since in most cases the first feedback could be the NACK. In view of the fact that the RV2 might not be self-decodable, the DTX may be detected by the incoming feedback NACK/DTX of the RV2.

2) RV0→NACK

In this case, since the feedback is the NACK, it means that the grant for the first HARQ transmission is received but it is failure to decode the PDSCH. It has more than 90% probability to be the NACK in this case. Thus, setting the NACK/DTX as NACK is a correct operation. The retransmitted RV2 may be combined with RV0 to achieve the IR combining gain.

When a NACK/DTX is received for both the first HARQ transmission (RV0) and the second HARQ transmission (RV2), there are four possible cases as follows:

1) RV0→DTX and RV2→DTX

In this case, the first and second HARQ transmissions are lost. Setting one feedback as a DTX is correct since the PDCCH has been lost for two times. However, the occurrence probability of this case is extremely low (1%× 1%=0.01%) unless the UE is at a deep fading zone. Given this, setting one ambiguous NACK/DTX as the DTX and performing retransmission of RV0 seems necessary.

2) RV0→DTX and RV2→NACK

In this case, since the first HARQ transmission is lost and the second HARQ transmission is not decoded correctly. Setting one ambiguous NACK/DTX as the DTX is correct, even though it appears to be a little late since the DTX actually arises in the first feedback. However, retransmission of RV0 in the third HARQ transmission allows for IR combining with the RV2.

3) RV0→NACK and RV2→DTX

In this case, the first HARQ transmission is not decoded correctly and the second HARQ transmission is lost. Thus, the set DTX is correct and retransmission of RV0 allows for doing chase combining with the RV0.

4) RV0→NACK and RV2→NACK

In this case, both the first and second HARQ transmissions are not decoded correctly. The occurrence probability of this case is also very low. In most cases, the probability is below 0.1%, which is much lower than 1% probability of the DTX. It indicates that the proposed setting has a lower probability to cause a DTX false alarm. The retransmission of RV0 at the third HARQ transmission allows for combining with the previous RV0 and RV2. After that, the failure of decoding the PDSCH indicates that the channel is being in deep fading or strong interference. The set DTX would assist the BS in assigning a more robust PDCCH for the DL assignment.

When the ambiguous NACK/DTX is received for more than second HARQ transmission (e.g., the third and fourth HARQ transmissions), since two RV0s have been transmitted before and the probability of both two RV0s being lost is very lower (1%×1%=0.01%), setting the NACK/DTX as the NACK and performing a HARQ transmission with a new RV are reasonable.

From the above discussions with respect to various scenarios of two ambiguous HARQ feedbacks, it can be seen that the setting based on the number of the HARQ transmission having been performed and previous feedback results according to the embodiments of the present disclosure is reasonable and facilitates the BS in distinguishing or setting the HARQ feedback when the ambiguous NACK/DTX is received.

Now returning back to the flowchart of FIG. 3, upon correspondingly setting the ambiguous HARQ feedbacks, the method 300 may optionally carry out the steps S322, S324, and S326 as depicted in the dashed blocks. For example, at step S322, the method 300 may perform LA outer-loop adjustment for DL traffic channel (e.g., PDSCH) or control channel (e.g., PDCCH). In particular, if the set HARQ feedback is a NACK, the LA performs a down-step adjustment for the traffic channel and an up-step adjustment for the control channel, as done when a definite NACK is received. If the set HARQ feedback is a DTX, the LA performs a down-step adjustment for the control channel, as done when a definite DTX is received. These adjustment operations may be applicable subsequent to the first HARQ transmission (i.e., the initial HARQ transmission) and the second HARQ transmission (i.e., the first HARQ retransmission), that is, immediately following the step S314 or one of steps S316, S318, and S320 in the flow, as depicted.

The method 300 may also select an explicit or implicit DL assignment for the second HARQ transmission at step S324. The purpose for selection is to try to improve DTX detection at the BS side as well as the throughput. It is based on the fact that the RV2 is not self-decodable if the coding rate ("CR") of the RV0 is greater than a threshold while it is self-decodable if the CR of the RV0 is below the threshold. For example, granting an implicit MCS (such as MCS29, MCS30, or MCS31 as specified in 3GPP TS 36.213, table 7.1.7.1-1) for the RV2 in case the CR of the RV0 is below the threshold will guarantee that the RV2 is unable to be decoded by the UE if the RV0 is DTX. Thus, the DTX will be detected by the BS by setting the NACK/DTX of RV2 as DTX; otherwise, most of the DTX of the RV0 would be subject to missing detection, which leads to improper LA adjustment of PDCCH. Similarly, in case the coding rate of the RV0 is greater than the threshold, granting an explicit MCS (such as one of MCS0 to MCS28 as specified in 3GPP 36.213, table 7.1.7.1-1) for the RV2 allows the RV2 to implement IR combining gain with the next RV if the feedback to the initial RV0 transmission is the DTX, which is beneficial for the throughput. At the same time, the DTX detection is guaranteed since the RV2 is not self-decoded. This is distinct from the prior art in which the RV2 is granted most likely with the implicit MCS and thereby the IR combining gain would be lost with the incoming RV if the initial RV0 is the DTX.

In a nutshell, it is preferred to grant an explicit MCS for the retransmission of RV2 from the throughput point of view and grant an implicit MCS for the retransmission of RV2 from DTX detection point of view. Further, the present disclosure proposes granting the MCS of the RV2 according to CR or MCS as follows:

If CR>Threshold 1 or MCS index>Threshold 2
  Explicit MCS grant (or Explicit DL assignment)
Else
  Implicit MCS grant (or Implicit DL assignment)
End In the manner as above, it allows the RV2 transmission with a larger MCS index to realize IR combining gain with the retransmitted RV0 and meanwhile guaranteeing the DTX detection rate. It should be noted that higher MCS allocation is a typical case in the CA scenario since SCells should be deactivated or de-configured if the channel quality is below a threshold.

The method 300 may perform the HARQ retransmission with the initial RV (i.e., the third HARQ transmission with RV0, as shown in table 1) at step S326. Further, the retransmitted RV0 should use an explicit MCS instead of an implicit MCS such as MCS 29, 30 and 31. Otherwise, it might be discarded by the UE in case there is no latest MCS information due to the first RV0 being lost and RV2 being assigned with the implicit MCS grant.

The foregoing has discussed with reference to FIG. 3 the embodiments of the present disclosure when the target number is two and the setting is made each time the ambiguous NACK/DTX is received. It should be noted that the steps S322, S324 and S326 are optional and preferred steps of the present disclosure and could be performed independently or in combination according to practical communication requirements. The following will discuss with reference to FIG. 4 the embodiments of the present disclosure when the target number is two and the setting is made after full reception of the ambiguous NACK/DTX, i.e., the first and second NACK/DTX feedbacks.

Figure 4:
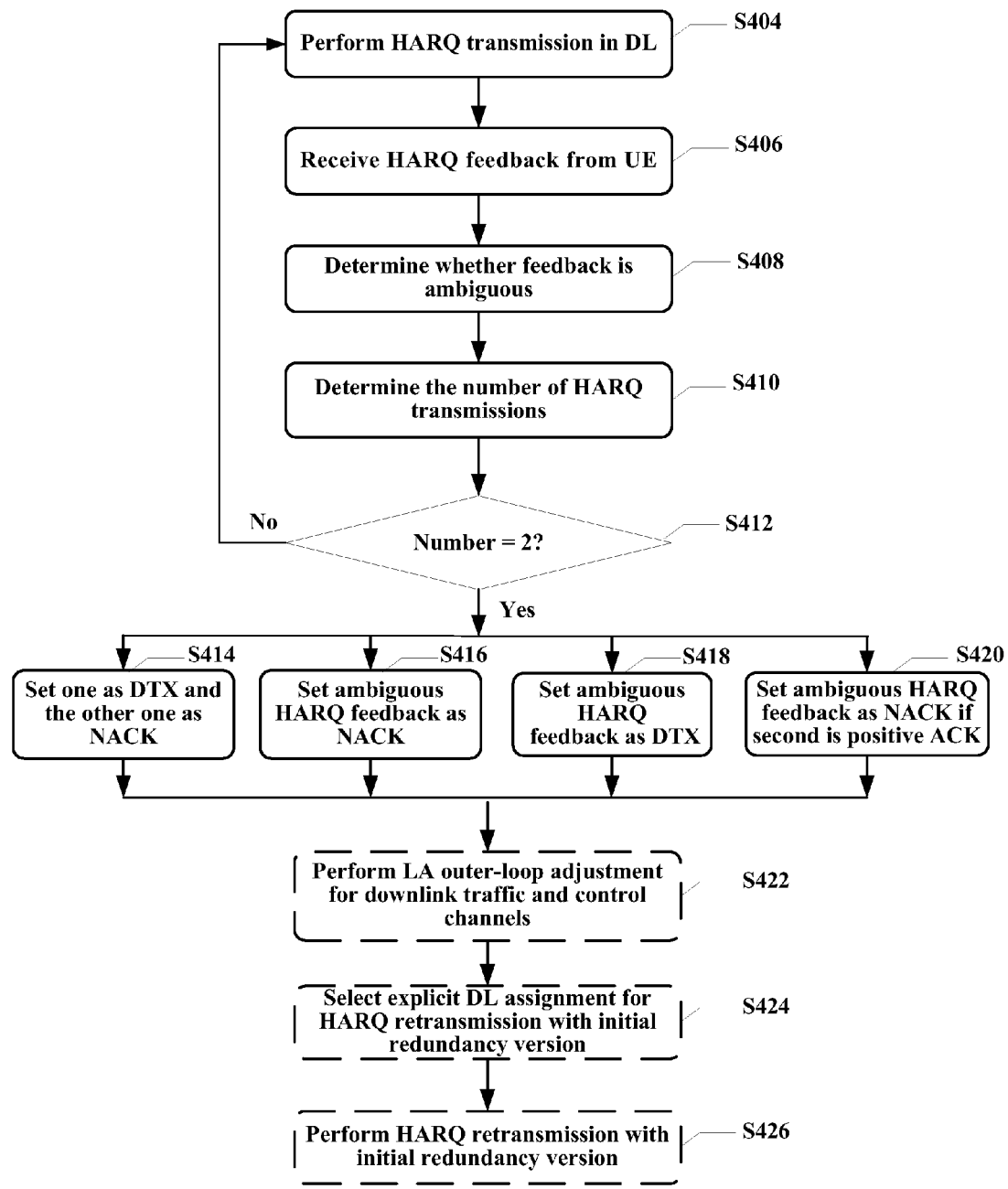
FIG. 4 is a schematic flowchart of another method for a HARQ transmission in a DL from a BS to at least one UE according to embodiments of the present disclosure.

FIG. 4 is a schematic flowchart of another method 400 for a HARQ transmission in a DL from a BS to at least one UE according to embodiments of the present disclosure. As illustrated in FIG. 4, the steps S404, S406, S408, and S410 are respectively similar to the steps S304, S306, S308 and S310 and thus the description thereof is omitted herein for simplified purposes. At step S412, the method 400 determines whether the number of HARQ transmissions is equal to two, which is a predetermined target number. If a first HARQ transmission has just been completed and the ambiguous NACK/DTX feedback received, the flow loops back to step S404 and the method 400 performs the second HARQ transmission and receives the feedback. Then, at step S412, since the number of HARQ transmissions having been performed is two now, the method 400 switches to steps S414, S416, S418 or S420 based on the number of the HARQ transmissions and received feedbacks.

At step S414, the method 400 sets one of two received HARQ feedbacks as the DTX and the other one as the NACK if the two HARQ feedbacks are both ambiguous, i.e., two NACK/DTX feedbacks being received. At step S416, the method 400 sets the ambiguous HARQ feedback as the NACK if one of the two received HARQ feedbacks is the DTX and the other one is the NACK/DTX. At step S418, the method 400 sets the ambiguous HARQ feedback as the DTX if one of the two received HARQ feedbacks is the NACK and the other one is the NACK/DTX. At step S420, the method 400 sets the ambiguous HARQ feedback as the NACK if the first received HARQ feedback is the NACK/DTX and the second received one is an ACK.

All possible combinations where the HARQ feedback for at least one HARQ transmission is ambiguous are listed in the below table 2 and the correspondingly set HARQ feedbacks with proposed methods are listed in the below table 3. It should be noted that the setting of index 3 of the table 3 means setting one of NACK/DTX in the index 3 of the table 2 as DTX, and the other as NACK. As a result, the set feedbacks in the index 3 of the table 3 could be the NACK and DTX for two ambiguous NACK/DTXs apiece, or as an alternative, the DTX and NACK for two ambiguous NACK/DTXs apiece.

TABLE 2 all possible feedbacks for two HARQ transmissions

| Index | Feedback for the first HARQ transmission | Feedback for the second HARQ transmission |
| --- | --- | --- |
| 1 | NACK | NACK/DTX |
| 2 | DTX | NACK/DTX |
| 3 | NACK/DTX | NACK/DTX |
| 4 | NACK/DTX | NACK |
| 5 | NACK/DTX | DTX |
| 6 | NACK/DTX | ACK |

TABLE 3 all set feedbacks for the two HARQ transmissions

| Index | Feedback for the first HARQ transmission | Feedback for the second HARQ transmission |
| --- | --- | --- |
| 1 | NACK | DTX |
| 2 | DTX | NACK |
| 3 | NACK (DTX) | DTX (NACK) |
| 4 | DTX | NACK |
| 5 | NACK | DTX |
| 6 | NACK | ACK |

Turning back to the flowchart of FIG. 4, after setting operations as depicted at steps S414, S416, S418, or S420, the method 400 may also optionally perform steps S422 and S426, which are respectively similar to the steps S322 and S326 and thus corresponding description thereof is omitted herein for simplified purposes. Regarding step S424, it could be noted from FIG. 4 that the method 400 selects the explicit DL assignment rather than the implicit one for the HARQ retransmission with RV0, i.e., the third HARQ transmission in this example. In this way, the third HARQ transmission is likely to be successfully decoded even in an instance in which no latest MCS information is available due to the missing of the RV0 transmitted at the first time and RV2 with the implicit MCS grant transmitted at the second time.

Figure 5:
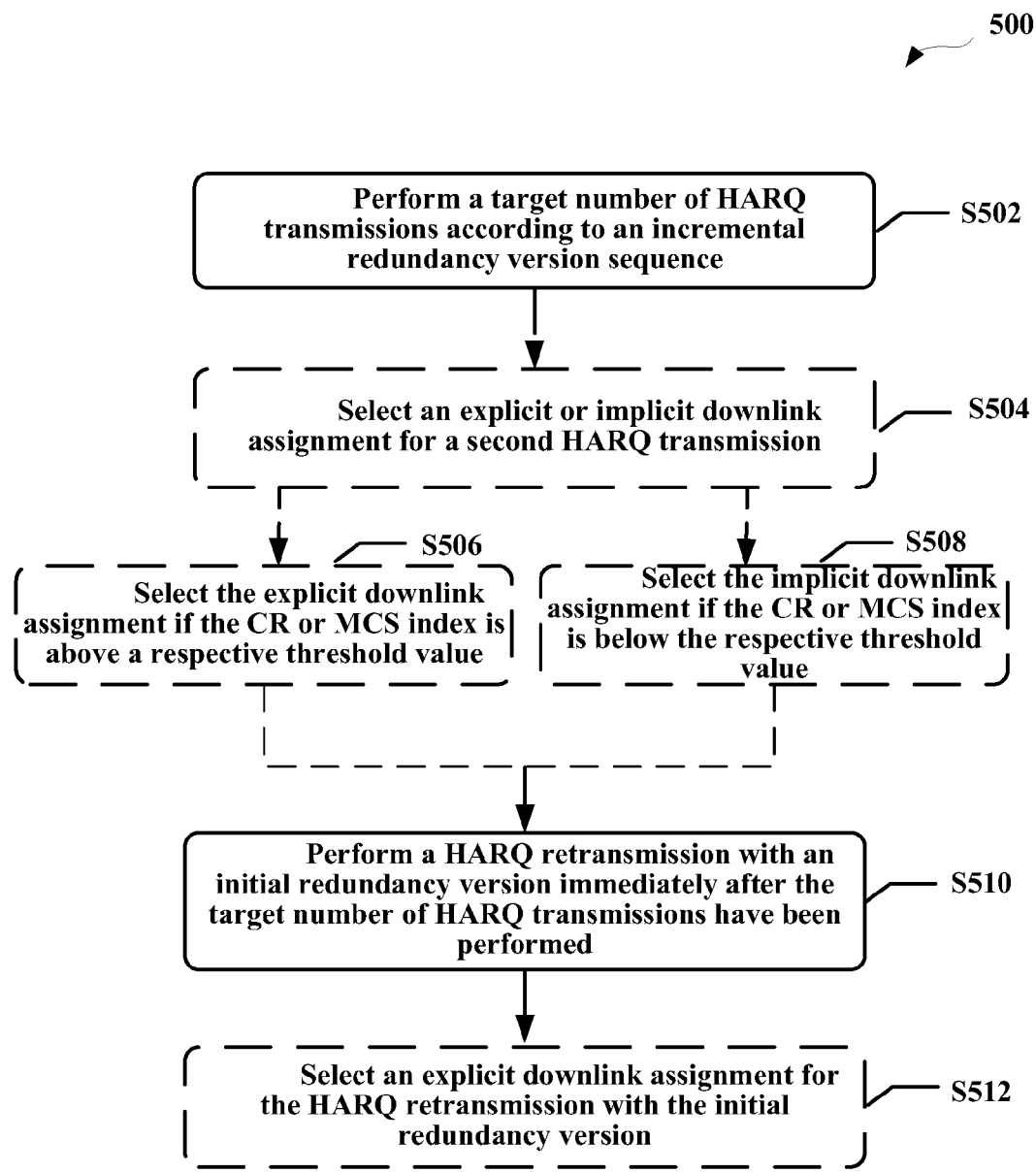
FIG. 5 is a schematic flowchart of another method for a HARQ transmission in a DL from a BS to at least one UE according to embodiments of the present disclosure.

FIG. 5 is a schematic flowchart of another method 500 for a HARQ transmission in a DL from a BS to at least one UE according to embodiments of the present disclosure. As illustrated in FIG. 5, at step S502, the method 500 performs a target number of HARQ transmissions according to an incremental RV sequence, e.g., RV0, RV2, RV3, and RV1. Then, at step S504, for a second HARQ transmission, the method 500 may optionally comprise selecting, at step S504, an explicit or implicit DL assignment for the second HARQ transmission. The selecting herein may be based on a CR or a MCS for the first or second HARQ transmission. In an embodiment, the method 500, at step S506, selects the explicit DL assignment if the CR or the MCS index is above a respective threshold value. In another embodiment, the method 500, at step S508, selects the implicit DL assignment if the CR or the MCS index is below the respective threshold value. It can be seen that different thresholds may be set separately for the CR and MCS. After the above optional steps S506 and S508, which are specific implementations of the step S504, the method 500 performs a HARQ retransmission with an initial RV immediately after the target number of HARQ transmissions have been performed.

At an additional step S512, wherein the target number is two, and a first received HARQ feedback and a second received HARQ feedback are both ambiguous, and the method 500 further comprises selecting an explicit downlink assignment for the HARQ retransmission with the initial redundancy version. For example, the method 500 may select the explicit DL assignment for the third HARQ retransmission with the RV0. In this manner, a potential IR combining gain may be achieved.

From the above description with respect to FIG. 5, it can be seen that the method 500 solves the problem of how to select a specific RV from an RV sequence and further improves the DL assignment during the HARQ incremental redundancy retransmission.

FIG. 6 is a block diagram schematically depicting an apparatus 600 for a HARQ transmission in a DL from a BS to at least one UE according to embodiments of the present disclosure. As illustrated in FIG. 6, the apparatus 600 comprises a receiving unit 601 configured to receive a HARQ feedback to a HARQ transmission performed with respect to a transport block. The apparatus 600 also comprises a determining unit 602 configured to determine whether the HARQ feedback is an ambiguous HARQ feedback with respect to a NACK or a DTX. Further, the apparatus 600 comprises a setting unit 603 configured to set the ambiguous HARQ feedback as the NACK or the DTX based on the number of HARQ transmissions having been performed and the corresponding received HARQ feedbacks within a target number of HARQ transmissions counting from a first HARQ transmission.

In an embodiment, the apparatus 600 further comprises a performing unit 605 configured to perform a HARQ retransmission with an initial redundancy version immediately after the ambiguous HARQ feedback is set as the DTX. In another embodiment, the first and second received HARQ feedback are ambiguous and the apparatus further comprises a selecting unit 604 configured to select an explicit DL assignment for the HARQ retransmission with the initial redundancy version. In a further embodiment, the performing unit 605 is further configured to perform LA outer-loop adjustment for DL traffic or control channels based on unambiguous HARQ feedbacks and set HARQ feedbacks.

The apparatus 600 as discussed above may be embodied as a BS or a part of the BS which, among other things, includes various units in addition to the above-mentioned units, to perform the steps of the methods 200, 300, and 400 according to the embodiments of the present disclosure.

FIG. 7 is a block diagram schematically depicting an apparatus 700 for a HARQ transmission in a DL from a BS to at least one UE according to embodiments of the present disclosure. As illustrated in FIG. 7, the apparatus 700 comprises a first performing unit 701 configured to perform a target number of HARQ transmissions according to an incremental redundancy version sequence. The apparatus 700 further comprises a second performing unit 702 configured to perform a HARQ retransmission with an initial redundancy version immediately after the target number of HARQ transmissions have been performed.

Although not shown, in an embodiment, the target number is two and a first received HARQ feedback is ambiguous, and the apparatus 700 further comprises a first selecting unit configured to select an explicit or implicit downlink assignment for a second HARQ transmission, e.g., based on a CR or a MCS for a first or second HARQ transmission. In another embodiment, the target number is two, and a first and a second received HARQ feedback are both ambiguous, and the apparatus further comprises a second selecting unit configured to select an explicit downlink assignment for the HARQ retransmission with the initial redundancy version.

The apparatus 700 as discussed herein may be embodied as a BS or a part of the BS, which includes, among other things, various units in addition to the above-mentioned units, to perform steps of the method 500 according to the embodiments of the present invention.

FIG. 8 is a schematic block diagram of an apparatus 800 for a HARQ transmission in a DL from an apparatus to at least one UE according to embodiments of the present disclosure. As illustrated in FIG. 8, the apparatus 800 includes at least one processor 801, such as a data processor, at least one memory (MEM) 802 coupled to the processor 801, and a suitable RF transmitter TX and receiver RX 803 coupled to the processor 801. The MEM 802 stores a program (PROG) 804. A combination of the processor 801 and the memory 802 forms processing means 805 as depicted in dashed line. The TX/RX 803 is for bidirectional wireless communications with a plurality of UEs, such as shown in FIG. 1. Note that the TX/RX 803 has at least one antenna to facilitate communication, though in practice an apparatus will typically have several for e.g., the MIMO communication. The apparatus 800 may be coupled via a data path to one or more external networks or systems, such as the internet, for example.

The PROG 804 is assumed to include instructions that, when executed by the processor 801, enable the apparatus 800 to operate in accordance with the exemplary embodiments of the present disclosure, as discussed herein with the methods 200-500.

In general, the embodiments of the present disclosure may be implemented by computer software executable by at least one processor 801 of the apparatus 800, or by hardware, or by a combination of software and hardware.

The MEM 802 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 800, there may be several physically distinct memory units in the apparatus 800. The processor 801 may be of any type suitable to the local technical environment, and may include one or more of general purpose computers, special purpose computers, microprocessors, digital signal processors (DSPs) and processors based on multicore processor architecture, as non limiting examples. The apparatus 800 may have multiple processors, such as for example an application specific integrated circuit chip that is slaved in time to a clock which synchronizes the main processor. The apparatus 800 discussed herein may be embodied as a BS or a part thereof.

Figure 9:
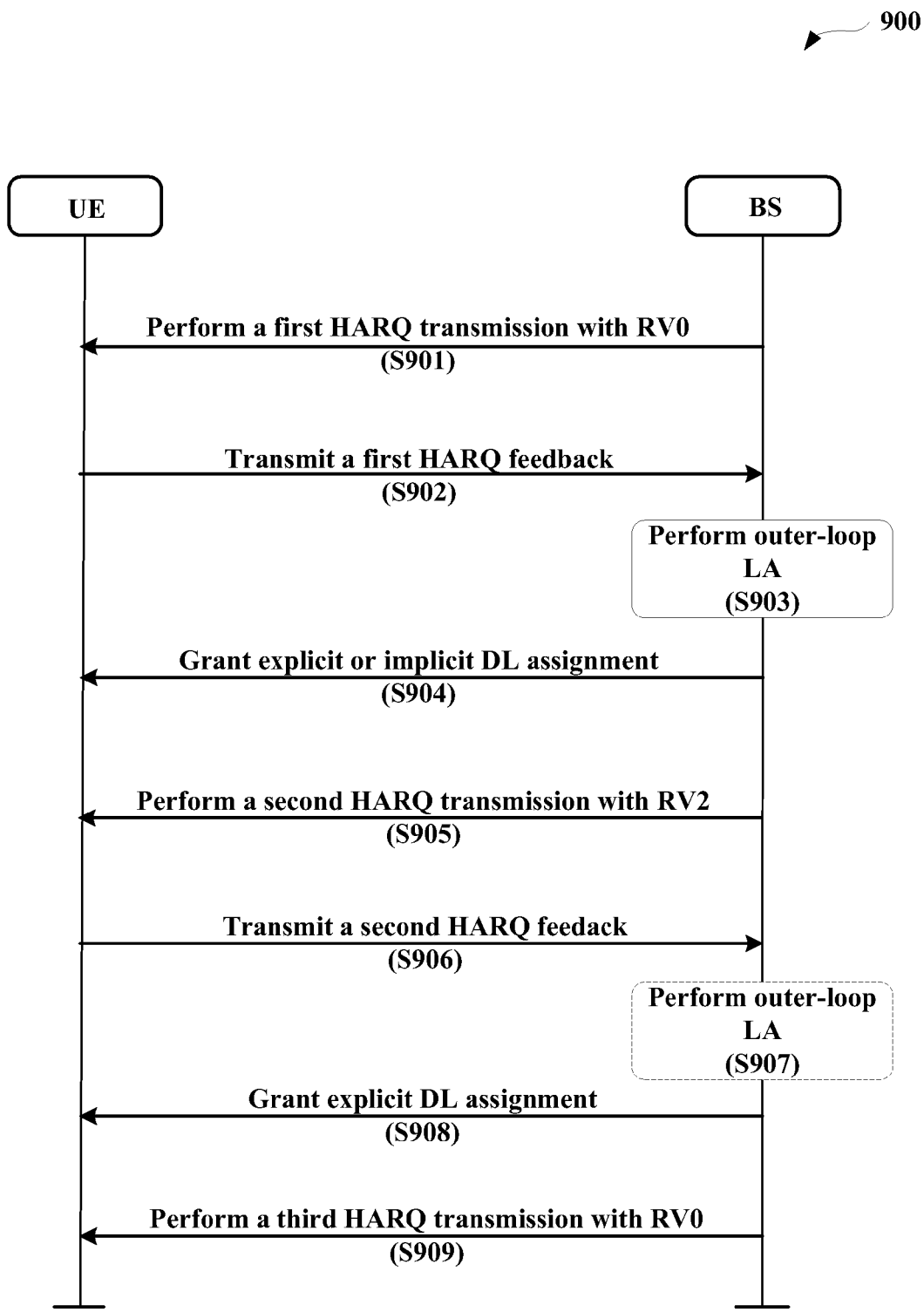
FIG. 9 is a schematic messaging diagram of HARQ transmissions between a UE and a BS according to embodiments of the present disclosure.

FIG. 9 is a schematic messaging diagram of HARQ transmissions between a UE and a BS according to embodiments of the present disclosure. As illustrated in FIG. 9, at step S901, a BS performs a first (or initial) HARQ transmission with RV0 with a transport block targeted to a UE. After reception operations associated with the first HARQ transmission, the UE transmits a first HARQ feedback in response to the first HARQ transmission at step S902. As discussed before, the first HARQ feedback could be an ambiguous NACK/DTX and may be set according to the methods as discussed with reference to FIGS. 2 and 3. Subsequent to the setting operation, the BS performs outer-loop LA adjustment based on the set HARQ feedback at step S903 and grants, at step S904, an explicit or implicit DL assignment based on, for example, whether CR or MCS index is above or below a respective threshold, as detailed before. Then, at step S905, the BS performs a second HARQ transmission and as a response, the UE, at step S906, transmits a second HARQ feedback to the BS. As an optional or alternative step, at step S907, the BS performs the outer-loop LA adjustment again similar to one performed at step S903. After that, the BS grants an explicit DL assignment to the UE at step S908. Then, the BS performs a third HARQ transmission with the RV0 at step S909.

It should be noted that the method 900 is illustrated in a messaging manner and the operations such as setting the ambiguous NACK/DTX, performing the outer-loop LA adjustment and granting the explicit or implicit DL assignment, are the same as those discussed in connection with the methods 200-500 as illustrated in FIGS. 2-5. Thus, the detailed description as discussed before regarding those operations may be equally applied herein.

From the above description, it is to be understood by those skilled in the art that the method 900, from a UE perspective, can be boiled down to a method for receiving a HARQ transmission in a DL from a BS. The method comprises receiving from the BS, each of a target number of HARQ transmissions with respect to a transport block, such as at step S901 or S905. The method also comprises transmitting to the BS, HARQ feedbacks corresponding to the target number of HARQ transmissions, such as at step S902 or S906, wherein the HARQ feedbacks include one or more ambiguous HARQ feedbacks with respect to a NACK or a DTX, wherein the receiving comprises receiving, such as at step S904 or S908, an explicit or implicit DL assignment which is made by the BS based on the number of HARQ transmissions having been performed and the corresponding received HARQ feedbacks within the target number of HARQ transmissions counting from a first HARQ transmission.

FIG. 10 is a schematic block diagram of an apparatus 1000 for receiving a HARQ transmission in a DL from a BS according to embodiments of the present disclosure. As illustrated in FIG. 10, the apparatus 1000 comprises a receiver 1001 configured to receive, from the BS, each of a target number of HARQ transmissions with respect to a transport block, and a transmitter 1002 configured to transmit to the BS, HARQ feedbacks corresponding to the target number of HARQ transmissions, wherein the HARQ feedbacks include one or more ambiguous HARQ feedbacks with respect to a NACK or a DTX, wherein the receiving comprises receiving an explicit or implicit DL assignment which is made by the BS based on the number of HARQ transmissions having been performed and the corresponding received HARQ feedbacks within the target number of HARQ transmissions counting from a first HARQ transmission.

The apparatus 1000 as discussed above may be embodied as a UE or a part of the UE which, among other things, includes various units in addition to the above-mentioned transmitter and receiver, to perform the steps such that the methods according to the embodiments of the present disclosure could be implemented cooperatively with the BS.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein. Further, computer programs can be coded for execution by the computing device to perform each step as described in the methods according to various embodiments of the present disclosure. These computer programs can be stored in a computer program product, such as an optical disk.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for performing a Hybrid Automatic Repeat Request (HARQ) transmission in a downlink from a base station to at least one user equipment, comprising:
    receiving a HARQ feedback to a HARQ transmission performed with respect to a transport block;
    determining whether the HARQ feedback is an ambiguous HARQ feedback with respect to a negative acknowledgement or a discontinuous transmission; and
    setting the ambiguous HARQ feedback as the negative acknowledgement or the discontinuous transmission based on the number of HARQ transmissions having been performed and the corresponding received HARQ feedbacks within a target number of HARQ transmissions counting from a first HARQ transmission.

2. The method according to claim 1, wherein the step of the setting is performed each time the ambiguous HARQ feedback is received.

3. The method according to claim 2, wherein the target number is two and the step of the setting comprises one of the following:
    setting a first received HARQ feedback as the negative acknowledgement if it is ambiguous;
    setting a second received HARQ feedback as the discontinuous transmission if the first received HARQ feedback is the negative acknowledgement and the second received HARQ feedback is ambiguous;
    setting the second received HARQ feedback as the discontinuous transmission if the first and the second received HARQ feedbacks are both ambiguous; and
    setting the second received HARQ feedback as the negative acknowledgement if the first received HARQ feedback is the discontinuous transmission and the second received HARQ feedback is ambiguous.

4. The method according to claim 3, wherein the first received HARQ feedback is ambiguous and the method further comprises:
    selecting an explicit or implicit downlink assignment for a second HARQ transmission.

5. The method according to claim 4, wherein the step of the selecting is based on a coding rate or a modulation and coding scheme for the first or second HARQ transmission.

6. The method according to claim 5, wherein the selecting of the explicit or implicit downlink assignment comprises:
    selecting the explicit downlink assignment if the coding rate or the modulation and coding scheme index is above a respective threshold value; and
    selecting the implicit downlink assignment if the coding rate or the modulation and coding scheme index is below the respective threshold value.

7. The method according to claim 1, wherein the ambiguous HARQ feedbacks are set after full reception of HARQ feedbacks for the target number of HARQ transmissions.

8. The method according to claim 7, wherein the target number is two and the step of the setting comprises one of the following:
    setting one of two received HARQ feedbacks as the discontinuous transmission and the other one as the negative acknowledgement if the two HARQ feedbacks are both ambiguous;
    setting the ambiguous HARQ feedback as the negative acknowledgement if one of the two received HARQ feedbacks is the discontinuous transmission and the other one is ambiguous;
    setting the ambiguous HARQ feedback as the discontinuous transmission if one of the two received HARQ feedbacks is the negative acknowledgement and the other one is ambiguous; and
    setting the ambiguous HARQ feedback as the negative acknowledgement if the first received HARQ feedback is ambiguous and the second received one is a positive acknowledgement.

9. The method according to claim 1, further comprising:
    determining, as the negative acknowledgement, each of the ambiguous HARQ feedbacks received when a positive acknowledgement or a negative acknowledgement with respect to another transport block is received, wherein the other transport block is paired with the transport block in downlink assignment and transmission; and determining, as the discontinuous transmission, the ambiguous HARQ feedback received when the discontinuous transmission with respect to the other transport block is received.

10. An apparatus for performing a Hybrid Automatic Repeat Request (HARQ) transmission in a downlink from a base station to at least one user equipment, comprising:

a receiving unit configured to receive a HARQ feedback to a HARQ transmission performed with respect to a transport block;

a determining unit configured to determine whether the HARQ feedback is an ambiguous HARQ feedback with respect to a negative acknowledgement or a discontinuous transmission; and a setting unit configured to set the ambiguous HARQ feedback as the negative acknowledgement or the discontinuous transmission based on the number of HARQ transmissions having been performed and the corresponding received HARQ feedbacks within a target number of HARQ transmissions counting from a first HARQ transmission.

11. A method for receiving a Hybrid Automatic Repeat Request (HARQ) transmission in a downlink from a base station, the method comprising:

receiving, from the base station, each of a target number of HARQ transmissions with respect to a transport block; and transmitting, to the base station, HARQ feedbacks corresponding to the target number of HARQ transmissions, wherein the HARQ feedbacks include one or more ambiguous HARQ feedbacks with respect to a negative acknowledgement or a discontinuous transmission, wherein the receiving comprises receiving an explicit or implicit downlink assignment which is made by the base station based on the number of HARQ transmissions having been performed and the corresponding received HARQ feedbacks within the target number of HARQ transmissions counting from a first HARQ transmission.

12. A user equipment for receiving a Hybrid Automatic Repeat Request (HARQ) transmission in a downlink from a base station, the user equipment comprising:

a receiver configured to receive, from the base station, each of a target number of HARQ transmissions with respect to a transport block; and a transmitter configured to transmit to the base station, HARQ feedbacks corresponding to the target number of HARQ transmissions, wherein the HARQ feedbacks include one or more ambiguous HARQ feedbacks with respect to a negative acknowledgement or a discontinuous transmission, wherein the receiver is further configured to receive an explicit or implicit downlink assignment which is made by the base station based on the number of HARQ transmissions having been performed and the corresponding received HARQ feedbacks within the target number of HARQ transmissions counting from a first HARQ transmission.

* * * * *